US006367612B1

(12) United States Patent
Dosso et al.

(10) Patent No.: US 6,367,612 B1
(45) Date of Patent: Apr. 9, 2002

(54) RETRACTABLE PUSHER DOG FOR POWER AND FREE CONVEYORS

(75) Inventors: Felice Dosso; Larry O'Dell, both of Winter Haven, FL (US)

(73) Assignee: Erie Manufacturing Inc., Bartow, FL (US)

( * ) Notice: Subject to any disclaimer, the term of this patent is extended or adjusted under 35 U.S.C. 154(b) by 0 days.

(21) Appl. No.: 09/632,961

(22) Filed: Aug. 4, 2000

(51) Int. Cl.[7] .............................................. B65G 19/00
(52) U.S. Cl. ................... 198/465.4; 198/717; 198/719; 198/728; 198/731; 104/172.1; 104/172.4; 104/172.5
(58) Field of Search ............................. 198/465.4, 717, 198/719, 728; 104/172.1, 172.4, 172.5, 172.3

(56) References Cited

U.S. PATENT DOCUMENTS

| | | | | |
|---|---|---|---|---|
| 2,619,916 A | * | 12/1952 | Rainer | 104/172.4 |
| 2,844,105 A | * | 7/1958 | King | 104/172.4 |
| 3,623,538 A | | 11/1971 | Wakabayashi et al. | |
| 4,004,680 A | | 1/1977 | Warmann | |
| 4,072,238 A | | 2/1978 | Knudsen | |
| 4,073,237 A | | 2/1978 | Wakabayashi | |
| 4,242,965 A | * | 1/1981 | Granet | 104/172.4 |
| 4,326,466 A | | 4/1982 | Parry et al. | |
| 4,389,944 A | | 6/1983 | Linton et al. | |
| 4,885,997 A | | 12/1989 | Wakabayashi | |
| 4,981,081 A | | 1/1991 | Summa | |
| 5,429,055 A | | 7/1995 | Schneuing et al. | |
| 5,437,231 A | | 8/1995 | Janzen et al. | |
| 5,606,915 A | | 3/1997 | Harris | |
| 6,109,422 A | * | 8/2000 | Gossner | 198/465.4 |

* cited by examiner

Primary Examiner—Christopher P. Ellis
Assistant Examiner—Mark A. Deuble
(74) Attorney, Agent, or Firm—Michael J. Porco

(57) ABSTRACT

A retractable pusher dog for an overhead power and free conveyor system is provided. The retractable pusher dog comprises a body portion formed from a rectangular cylinder with a spring and pusher member disposed within the cylinder. When a force greater than the static spring force is applied to the pusher member, the pusher member retracts into the body portion thus reducing the overall height of the pusher dog. Due to its self-actuating retraction, the retractable pusher dog of the subject invention requires no modifications to the powered and free rails or to the load trolleys. The retractable pusher dog will prevent jamming of load trolleys by allowing the pusher dog to bypass an off-timed load carrier, introduced from a different powered rail, until it is properly aligned on the main rail. Also, the body plates of the pusher dog facilitates coupling the pusher dog to the drive chain without disassembling the drive chain thus reducing downtime of the conveyor system and labor costs.

16 Claims, 4 Drawing Sheets

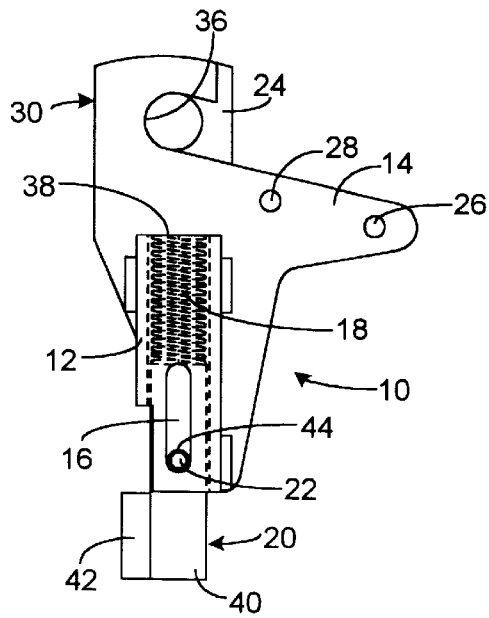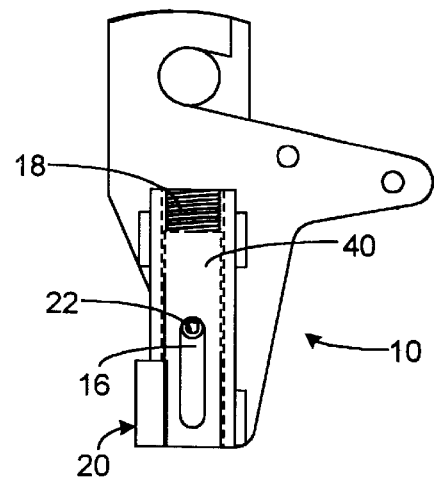
FIG. 1
FIG. 2
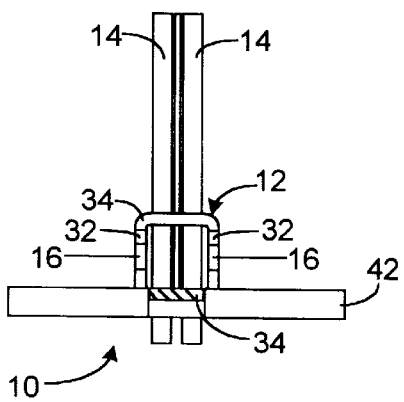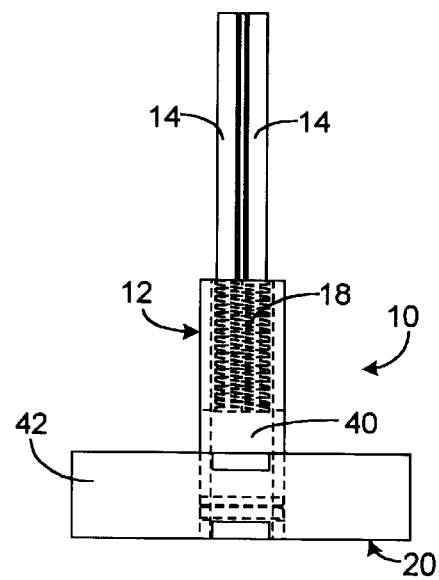
FIG. 3
FIG. 4

RETRACTABLE PUSHER DOG FOR POWER AND FREE CONVEYORS

BACKGROUND OF THE INVENTION

The present invention relates to a power and free conveyor system, particularly to a retractable pusher dog for driving rail-guided load carriers or trolleys along a free rail of an overhead power and free conveyor system.

In typical power and free conveyors, a leave in is mounted on a load trolley or trolleys which run on a non-powered free rail. The load carrier is moved by a continuously running power or drive chain by engagement between a drive element or pusher dog on the drive chain and a trolley head on the load carrier or trolley. The drive chain is supported by ball bearing wheels running inside an enclosed powered track. In overhead power and free conveyors, a load supported by the load carrier is suspended below the free rail supporting the load trolleys and the drive chain. The pusher dog extends downward to engage an upwardly extending trolley dog or head or simply the front trolley head of the load carrier. The trolley head may be caused to disengage from the pusher dog to allow the load to coast on a downhill section of the load track, to halt the load for operations thereon, or the like. An efficient conveyor system provides for repeatability, precision and continuous flow of operations.

On many power and free conveyors, the load trolleys incorporate accumulation mechanisms which cause drive disengagement of carriers approaching behind a halted carrier to prevent collisions between the carriers and loads. Examples of such systems are disclosed in U.S. Pat. Nos. 4,073,238 to Knudsen, 4,326,466 to Parry et al., 4,389,944 to Linton et al., and 5,606,915 to Harris. While these systems will prevent damage to the trolleys and the drive chain, the accumulation mechanisms are only activated when one load carrier comes into engagement with another carrier actuating the withdrawal of the trolley dog. These systems are best suited for single rail systems where the load trolley and pusher dog are always in the same horizontal path. A drawback of these systems are increased costs due to the complexity and added components of the actuating means constructed on the trolley. Also, some of the systems require resetting of the trolley dogs after actuation out of engagement with the pusher dog resulting increased downtime and increased labor cost to keep the system operating efficiently. These systems do not contemplate a load trolley entering a branch line where misalignment between a load trolley and pusher dog is possible.

To avoid damage to the drive chain, some systems incorporate drive elements or pusher dogs which can actuate out of engagement with the trolley dog. Examples of such systems are disclosed in U.S. Pat. Nos. 3,623,538, 4,073,237 and 4,885,997 to Wakabayashi, and U.S. Pat. No. 4,004,680 to Warmann. To accomplish the disengagement of the drive element from the trolley dog, modifications must be made to the trolleys and/or rails. These modifications increase the complexity of the system and correspondingly increase the cost of installation. Also, due to the complexity of the multi-component pusher dogs, the systems are exposed to increased points of failure and increased downtimes.

The above-mentioned systems are primarily concerned with preventing damage to the various components of a power and free conveyor caused by a blockage or stoppage of a load trolley on the free rail. The prior art systems do not contemplate the damage that occurs when a load trolley is fed into a powered system in harddog mode and the timing between the two is off. The prior art pusher dogs are usually rigid in normal operation. If a load trolley is fed into a powered system out of synchronization with the pusher dogs of the power chain, the pusher dog comes into contact with the top of the load trolley and can crush the load trolley causing a blockage on the free rail resulting in system downtime. Alternatively, the pusher dog itself could be damaged or, if enough stress is put on the drive chain, the chain could fracture and break.

Additionally, this lack of flexibility of the pusher dog causes conveyor system designers to over-compensate for possible troubled areas, such as making extra wide turns, very gradual declines, etc, which result in overly large systems and increased material costs. Also, due to the rigidity of the pusher dog, the powered rail and free rail must be precisely aligned to prevent contact between the rigid pusher dog and free rail thus avoiding damage to the system. The precise and accurate setup of this type of system will also result in increased installation labor costs.

It is an object of the subject invention to provide a retractable pusher dog which is self-actuating.

It is another object of the subject invention to provide a retractable pusher dog which requires no modifications to the power and free rails or load trolleys.

Another object of the subject invention is to provide a retractable pusher dog which allows automatic feeding of load trolleys from one powered system, in harddog mode, to another without jamming the load trolleys when timing may be off.

It is another object of the subject invention to provide a retractable pusher dog which allows manual feeding of load trolleys onto a powered system in harddog mode without the worry of binding or breaking the trolley.

It is another object of the subject invention to provide a retractable pusher dog with enough flexibility to enable system designers to be more versatile in troubled areas.

A further object of the subject invention is to provide a retractable pusher dog which can be installed on a drive chain without disassembling the drive chain.

It is a further object of the subject invention to provide a retractable pusher dog which can be retrofitted onto many types of existing power and free conveyors.

SUMMARY OF THE INVENTION

The above stated objects are met by a new and improved retractable pusher dog. The subject retractable pusher dog comprises a body portion formed from a rectangular cylinder with two body plates spaced parallel from each other along the longitudinal axis of the cylinder. The cylinder further comprises two pairs of parallel walls with one pair of the parallel walls having slots in the direction of the longitudinal axis of the cylinder. The body plates are formed to engage a drive chain of a power and free conveyor system. The body plates are positioned to close a first end of the rectangular cylinder. A spring and pusher member are disposed within the cylinder. The pusher member retains the spring in the cylinder. The pusher member is coupled to the body portion by a first locking pin which passes through the pusher member and the slots of the cylinder. The first locking pin slidingly engages the longitudinal slots to allow the pusher member to come into contact with the spring. When a force greater than the static spring force is applied to the pusher member, the pusher member retracts into the body portion thus reducing the overall height of the pusher dog.

A conventional power and free conveyor system comprises a powered drive chain spaced horizontally parallel above a non-powered free rail. In particular in the clothing industry, articles of clothing are suspended from load carriers which move freely upon the non-powered free rail. The powered drive chain comprises a plurality of pusher dogs to continuously move the load carriers throughout the system.

An advantage to the self-actuating retraction of the subject invention is realized when a system comprises many branches leading into a main rail. When one powered system in harddog mode is automatically feeding load carriers to another powered system in harddog mode, damage may result if the timing of the two systems is off. With the new and improved retractable pusher dog, jamming of load trolleys will be prevented by allowing the pusher member to bypass an off-timed load carrier until it is properly aligned on the main rail. In the same sense, binding and breaking of trolleys will be avoided when manually feeding load carriers onto a powered system in harddog mode.

Another advantage of the new and improved retractable pusher dog of the subject invention is the versatility it gives conveyor system designers. For example, when designing inclines, care must be taken to ensure proper alignment between the powered rail and the free rail. If a rigid pusher dog comes into contact with the free rail, undue stress will be placed on the rails and its supporting structure. If the pusher dog of the subject invention comes into contact with the free rail, it will retract upon itself resulting in no stress or strain upon the rail system. This feature gives system designers flexibility in designing steep gradients and such.

The body plates of the pusher dog facilitate coupling the subject invention to the drive chain of the powered rail. The end of the body plate opposite the end positioned on the rectangular cylinder is formed in a "C" shape. This C-shaped end engages a center link of the drive chain and is fixed by a locking plate. This coupling feature of the subject invention permits pusher dogs to be installed or replaced without disassembling the drive chain thus reducing downtime and labor costs. This feature also allows the subject invention to be retrofitted onto many types of existing power and free conveyors.

The above and other objects, features and advantages of the present invention will become apparent from the following detailed description considered in connection with the accompanying drawings. It should be understood, however, that the drawings are designed for the purpose of illustration only and not as a definition of the limits of the invention.

BRIEF DESCRIPTION OF THE DRAWINGS

FIG. 1 is a side elevational view of the retractable pusher dog of the subject invention in an unbiased state.

FIG. 2 is a side elevational view of the retractable pusher dog of the subject invention in a biased state.

FIG. 3 is a bottom plan view of the retractable pusher dog of the subject invention.

FIG. 4 is a front plan view of the retractable pusher dog of the subject invention.

DETAILED DESCRIPTION OF THE INVENTION

Figure 5:
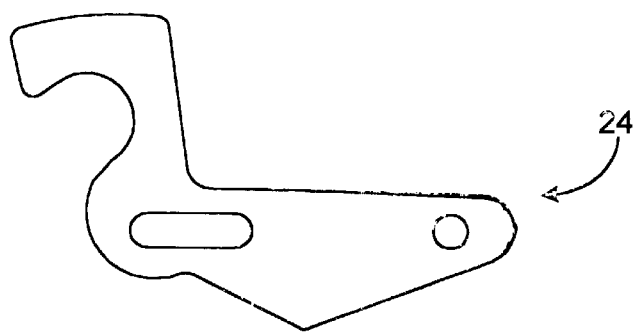
FIG. 5 is a side elevational view of the locking plate of the retractable pusher dog of the subject invention.

Referring to FIGS. 1 through 4, the retractable pusher dog of the present invention is generally indicated by the reference numeral 10. The subject retractable pusher dog 10 comprises a body portion 30 and a pusher member 20. The body portion 30 is formed from a rectangular cylinder 12 with two body plates 14 spaced parallel from each other along the longitudinal axis of the cylinder 12. The cylinder 12 includes two pairs of parallel walls 32,34 with the first pair of parallel walls 32 having slots 16 in the direction of the longitudinal axis of the cylinder 12. The body plates 14 are formed with one end 38 to be fixed to the cylinder 12 and a second end 36 formed in a "C" shape. The first end 38 of the body plates 14 are positioned to close a first end of the rectangular cylinder 12. The C-shaped end 36 of the body plates 14 are formed to engage a drive chain of the power and free conveyor system which will be described in detail below.

A biasing means 18 is disposed within the cylinder 12 to come into contact with the end closed off by the body plates 14. Such biasing means are known in the art, for example, a coil spring, an elastomeric member, etc, and a spring will be used for this illustration. A pusher member 20 is then disposed within the cylinder 12 retaining the spring 18 therein. The pusher member 20 is generally "T" shaped comprising a rectangular shaft 40 and a wing-like bar member 42. The pusher member 20 further comprises a circular channel 44 which passes through the shaft 40. The pusher member 20 is coupled to the body portion 30 by a first locking pin 22 which passes through the shaft 40 of the pusher member 20 and the slots 16 of the cylinder 12. The first locking pin 22 slidingly engages the longitudinal slots 16 to allow the pusher member 20 to come into and out of contact with the spring 18. When a force greater than the static spring force of the spring 18 is applied to the pusher member 20, the pusher member 20 retracts into the body portion 30 thus reducing the overall height of the pusher dog 10, as shown in FIG. 2.

Figure 6:
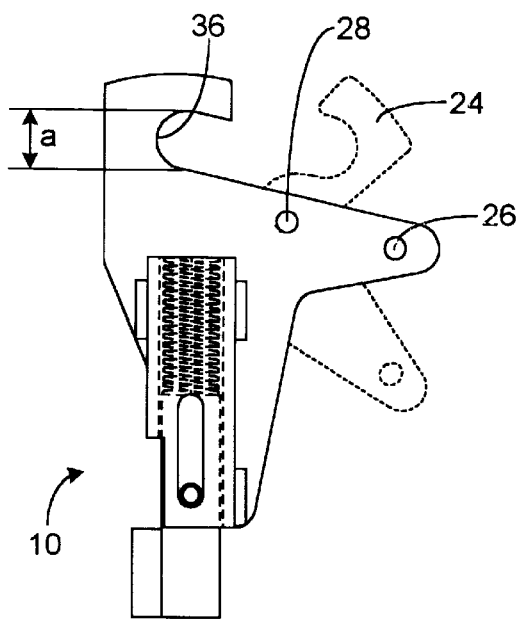
FIG. 6 is a side elevational view of the retractable pusher dog of the subject invention with the locking plate of FIG. 5 in an unfixed position prior to installation of the pusher dog onto the conveyor system.
Figure 7:
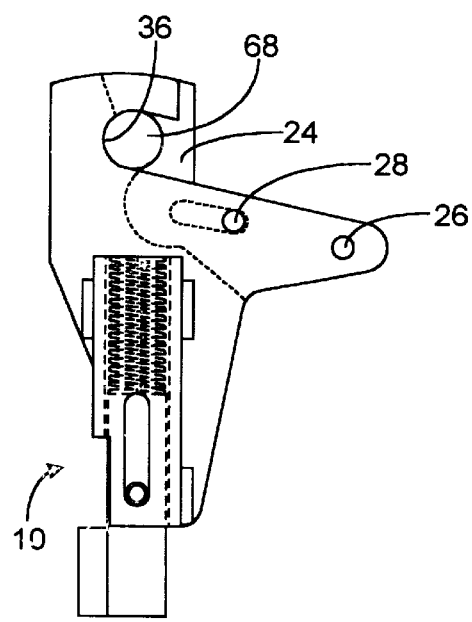
FIG. 7 is a side elevational view of the retractable pusher dog of the subject invention with the locking plate of FIG. 5 in a fixed position to hold the pusher dog onto the drive chain of the conveyor system.
Figure 8:
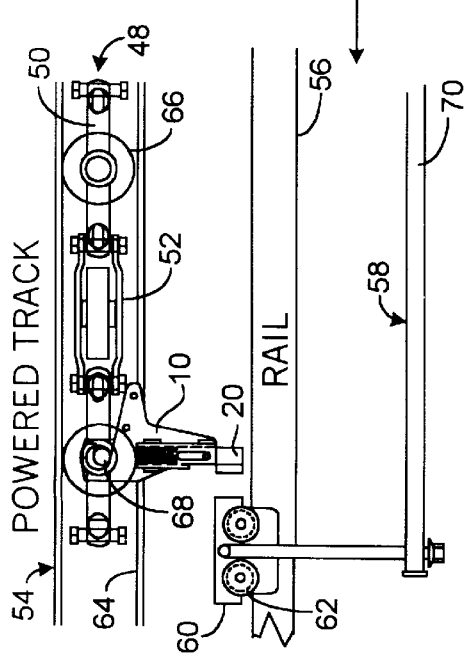
FIG. 8 is a side elevational view of a power and free conveyor system where the retractable pusher dog of the subject invention is about to engaged a load trolley mounted on the free rail.

Referring to FIG. 8, the overhead power and free conveyor system comprises a powered rail 54 spaced horizontally parallel above a non-powered free rail 56. The powered rail 54 includes a pair of mutually inwardly turned channels 64 in which the drive chain 48 travels. The drive chain 48, which is continuously driven by a motor not shown, comprises alternating center links 50 and side links 52 which are supported within the channels 64 by a pairs of support rollers 66. The support rollers 66 are coupled together by roller pin 68. The C-shaped end 36 of body plate 14 is formed to engage the roller pin 68 to couple the pusher dog 10 to the drive chain 48. As shown in FIGS. 5 through 7, a locking plate 24 is utilized to fix the pusher dog 10 to the drive chain 48. With the locking plate 24 unfixed, the C-shaped end 36, with a diameter "a" slightly larger than the diameter of the roller pin 68, is placed to surround the roller pin 68. The locking plate 24 is then slid along retaining pin 28 until the combination of the body plate 14 and locking plate 24 completely surround the roller pin 68 to secure the pusher dog 10 to the drive chain 48.

The free rail 56 of the overhead conveyor system is substantially tubular and is supported by a plurality of brackets coupled to the channels 64 of the powered rail 54. The free rail 56 guides a plurality of load carriers 58 which are comprised of two load trolleys 60 bearing a load bar 70 for the placement of articles for transport. The track rollers 62 of the load trolleys 60 are provided with a concentric groove so that they roll guided on the profile of the free rail 56. As shown in FIG. 8, as the drive chain 48 moves in the direction of travel "t", the pusher member 20 of the pusher dog 10 comes into contact with the load trolley 60 to propel the load carrier 58 throughout the conveyor system.

Figure 9:
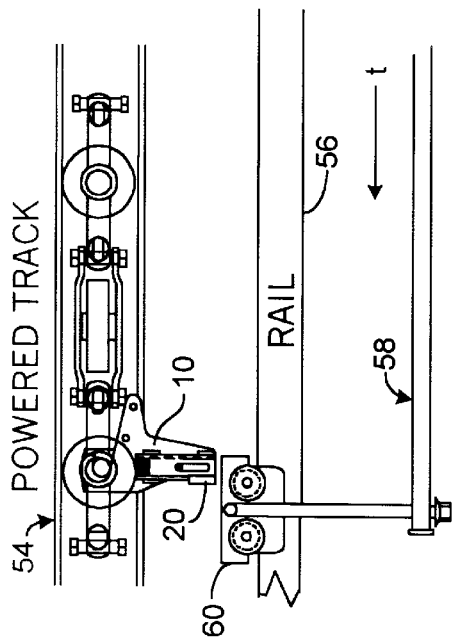
FIG. 9 is a side elevational view of a power and free conveyor system where the retractable pusher dog of the subject invention is in a biased state to bypass a load trolley where the load trolley's timing is out of synchronization with the powered track.
Figure 10:
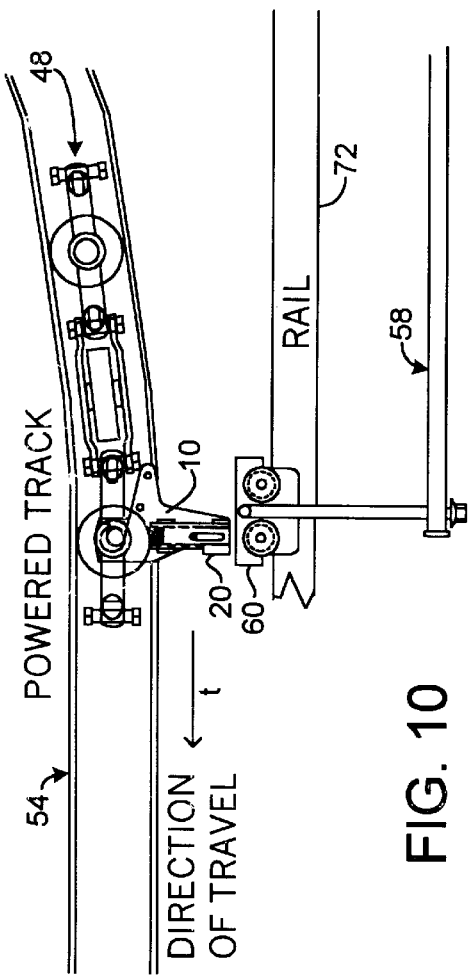
FIG. 10 is a side elevational view of a power and free conveyor system where the load carrier is manually fed into the system at a improper loading time interval causing the pusher dog to retract upon itself.

As shown in FIGS. 9 and 10, the retractable pusher dog 10 of the subject invention is beneficial where load carriers 58 are fed into the conveyor system from a free rail branch 72. Branch lines 72 may be utilized when load carriers 58 are taken out of engagement with the powered rail 54, for the articles of transport to be worked on, and then placed back into the system. Branch lines 72 are also employed at different loading docks within a facility. When load carriers 58 are fed into engagement with a powered rail 54, care must be taken to ensure the timing of the drive chain 48 is in sync with the entering load carriers 58. Previously, if the timing was off, damage would occur to the load trolley 60, the pusher dog 10 or both. With the new and improved pusher dog 10 of the subject invention, if load carrier 58 enters the system in conflict with the pusher dog 10, the pushing member 20 will come into contact with the load trolley 60 and would retract into the pusher dog 10. Depending on the friction of the free rail 56, the pusher dog 10 will slide over the load trolley 60 or will stay in contact with the load trolley 60 propelling the load carrier 58, in the direction of travel "t", until it comes into contact with another load carrier 58 allowing the pusher dog 10 to slide off and engage the next load carrier 58. By allowing the pusher dog 10 to slide over the load trolley 60, there will only be a minimal stress on the load trolley 60 and the drive chain 48 eliminating the possibility of breakage which would result in long periods of downtime.

Figure 11:
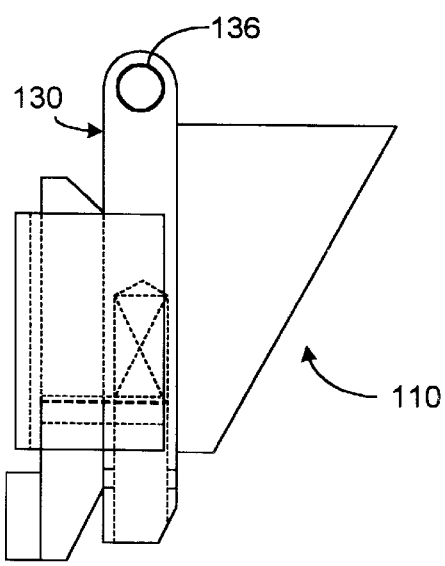
FIG. 11 is a side elevational view of a second embodiment of the retractable pusher dog of the subject invention in an unbiased state.
Figure 12:
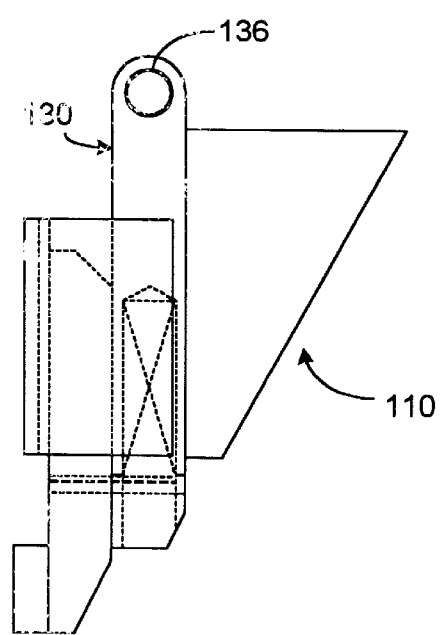
FIG. 12 is a side elevational view of a second embodiment of the retractable pusher dog of the subject invention in a biased state.

Referring to FIGS. 11 and 12, a second embodiment of the retractable pusher dog 110 of the subject invention is shown. In use, the operation of the second embodiment is identical to that described above. The coupling means 136 of the second embodiment is integrally formed with the body 130 of the pusher dog 110 to form a permanent connection to the drive chain 48 of the conveyor system.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appending claims, and not limited to the foregoing description.

What is claimed is:

1. An overhead power and free conveyor system, said conveyor system comprising:

a powered rail, said powered rail formed from a pair of mutually inward turned channels, wherein a drive chain continuously driven by a motor travels within said channels in a direction of transport;

a tubular free rail spaced horizontally parallel below said powered rail, wherein said free rail is supported by a plurality of brackets coupled to the channels of said powered rail;

at least one load carrier, said load carrier includes a load trolley bearing a load bar for articles of transport and track rollers formed with a concentric groove for guided engagement with said tubular free rail; and a pusher dog having a body portion and a pusher member, said body portion formed from a cylinder with a body plate positioned to close a first end of said cylinder, said body plate formed to engage the drive chain to couple said pusher dog to said drive chain, wherein a biasing means is disposed within said cylinder and retained by said pusher member to allow said pusher member to retract into said body portion whereby when a force greater than a static spring force of said biasing means is applied to said pusher member, said pusher member retracts thus reducing the overall height of said pusher dog.

2. A conveyor system as in claim 1, wherein said body plate is formed with a "C" shaped end to facilitate engagement with said drive chain.

3. A conveyor system as in claim 2, wherein said body portion is formed from two body plates spaced parallel from each other along a longitudinal axis of said cylinder.

4. A conveyor system as in claim 3, wherein said pusher member is generally "T" shaped comprising a rectangular shaft and a wing-like bar member.

5. A conveyor system as in claim 4, wherein said biasing means is a coil spring.

6. A conveyor system as in claim 5, wherein said biasing means is an elastomeric member.

7. A conveyor system as in claim 6, wherein a locking plate is slidingly secured to said body plate to fix said pusher dog to said drive chain.

8. A conveyor system as in claim 1, wherein said body plate is formed with a rigid circular connection for engagement with said drive chain.

9. A retractable pusher dog comprising a body portion and a pusher member, said body portion formed from a cylinder with a body plate positioned to close a first end of said cylinder, said body plate formed to engage a drive chain of a power and free conveyor system to couple said pusher dog to said drive chain, wherein a biasing means is disposed within said cylinder and retained by said pusher member to allow said pusher member to retract into said body portion whereby when a force greater than a static spring force of said biasing means is applied to said pusher member, said pusher member retracts thus reducing the overall height of said pusher dog.

10. A retractable pusher dog as in claim 9, wherein said body plate is formed with a "C" shaped end to facilitate engagement with said drive chain.

11. A retractable pusher dog as in claim 10, wherein said body portion is formed from two body plates spaced parallel from each other along a longitudinal axis of said cylinder.

12. A retractable pusher dog as in claim 11, wherein said pusher member is generally "T" shaped comprising a rectangular shaft and a wing-like bar member.

13. A retractable pusher dog as in claim 12, wherein said biasing means is a coil spring.

14. A retractable pusher dog as in claim 13, wherein said biasing means is an elastomeric member.

15. A retractable pusher dog as in claim 14, wherein a locking plate is slidingly secured to said body plate to fix said pusher dog to said drive chain.

16. A retractable pusher dog as in claim 9, wherein said body plate is formed with a rigid circular connection for engagement with said drive chain.

* * * * *